United States Patent [19]
Hirano et al.

[11] Patent Number: 5,289,329
[45] Date of Patent: Feb. 22, 1994

[54] COMPOSITE TYPE MAGNETIC HEAD AND MAGNETIC RECORDING/PLAYBACK APPARATUS ADOPTING THE SAME

[75] Inventors: Akiyoshi Hirano; Hiroshi Yamaki, both of Nagaokakyo, Japan

[73] Assignee: Mitsubishi Denki Kabushiki Kaisha, Tokyo, Japan

[21] Appl. No.: 997,139

[22] Filed: Dec. 22, 1992

Related U.S. Application Data

[63] Continuation of Ser. No. 588,132, Sep. 26, 1990, abandoned.

[30] Foreign Application Priority Data

Sep. 27, 1989 [JP] Japan ................................ 1-250883
Dec. 4, 1989 [JP] Japan ................................ 1-316006

[51] Int. Cl.$^5$ ............................................ G11B 5/265
[52] U.S. Cl. ................................................... 360/121
[58] Field of Search .................................... 360/121

[56] References Cited

U.S. PATENT DOCUMENTS

4,953,049 8/1990 Okuda .................................. 360/126
5,040,087 8/1991 Lee ....................................... 360/121

FOREIGN PATENT DOCUMENTS

54-96013 7/1979 Japan .
62-043809 2/1987 Japan .
2167597A 5/1986 United Kingdom .

*Primary Examiner*—A. J. Heinz

[57] ABSTRACT

A composite type magnetic head suitable for use in a magnetic recording and playback apparatus includes a main gap having an azimuth preset for recording and/or playing back a signal and a pair of pseudo gaps, each having an azimuth which is arranged to be not parallel to the main gap. The azimuth of the pseudo gaps is also arranged not to be parallel to the azimuth of the signal recorded on a recording track. With the above-described structure, the output level of a signal produced by the pseudo gap when recording or reproducing is reduced such that interference which the pseudo gap exerts upon a signal played back by the main gap is reduced, thereby eliminating deterioration in the signal-to-noise ratio.

10 Claims, 11 Drawing Sheets

COMPOSITE TYPE MAGNETIC HEAD AND MAGNETIC RECORDING/PLAYBACK APPARATUS ADOPTING THE SAME

This application is a continuation of application Ser. No.: 07/588,132 filed on Sep. 26, 1990, now abandoned.

DETAILED DESCRIPTION OF THE INVENTION

1. Field of the Invention

The present invention relates to a composite type magnetic head, employed in a magnetic recording and playback apparatus, for scanning across the same track of a magnetic medium and maintaining contact with the surface of the medium by means of a plurality of magnetic heads, thereby realizing a playback or a recording/playback performance.

2. Description of the Related Art

Heretofore, a high density recording with a short wave length has been tried by processing a magnetic recording medium with a high magnetic coercive force. As a result, a head saturation is a drawback. For example, in the case of small-size VTR, particles of the ferritic materials such as monocrystal ferrite, hot pressed ferrite, and high density ferrite are used as material for a video head. These ferritic materials rarely cause high frequency losses and it is possible to obtain a head having a high playback response.

However, since the saturation magnetic flux is as much as about 5,000 (gauss), if the length of the recording head gap amounts to about 0.5 μm, the recording head saturation occurs on a recording material having a magnetic coercive force of about 1,000 (öe) and a thickness of a few um because the head magnetic flux attenuates in the direction of the thickness of the recording medium, preventing a tape performance with a high magnetic coercive force from being obtained sufficiently. Although the use of a metal alloy such as Sendust, which has a larger saturation magnetic flux than the ferritic materials, may be considered as a solution for this head saturation, it causes deterioration in the playback response because the eddy current loss in the high frequency region caused by the metal alloy is larger than that of the ferritic materials.

Figure 10A:
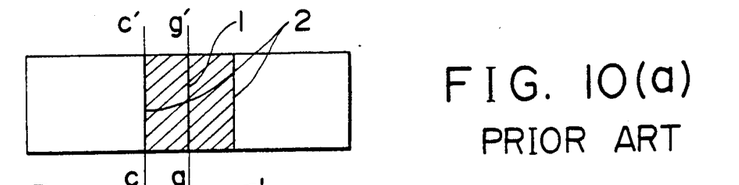
FIGS. 10(a) and 10(b) show a conventional composite type head.
Figure 10B:
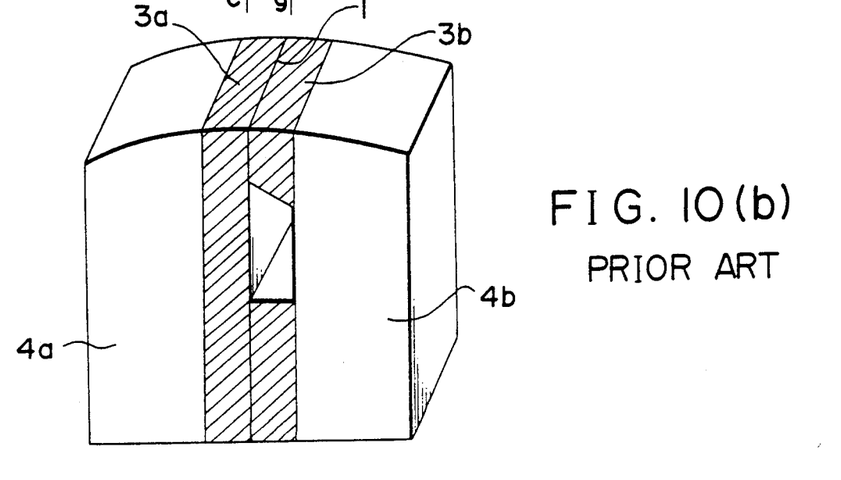

In view of eliminating the problems due to the single use of the ferritic materials or metal materials and utilizing advantages of these materials, a composite type magnetic head shown in FIG. 10 has been devised. In FIG. 10, reference numeral 1 designates a main gap; 2, a pseudo gap; 3a and 3b, pole pieces composed of metal magnetic materials such as a Sendust having a high saturation magnetic flux density; 4a and 4b, yokes (half pieces of the core) made up of a high-permeability material such as a ferrite, etc.; a line g—g', a junction of the main gap taken along the line g—g'; and a line c—c', a junction at which dissimilar metals make contact.

In the composite type magnetic head having the above-described structure, since a high saturation magnetic flux material is used exclusively at pole piece regions 3a and 3b in the vicinity of the gap at which a magnetic flux increases to its highest level when recording, and material which has a relatively low saturation magnetic flux density and a high permeability, such as a ferrite material, is used at the remnant region, the composite type magnetic head having both a high recording and a high playback response can be obtained.

However, according to the existing magnetic head composed by the combination of such dissimilar materials, the junction c—c' of the dissimilar materials is arranged in parallel with the main gap junction g—g' as shown in FIG. 10a. Such an arrangement results in forming a minute gap. This gap works as a pseudo gap, deteriorating the signal to noise ratio of the recording signal. Since the length of a recording/playback gap of the recent VTR is reduced to as narrow as 0.3 μm, it is difficult to ignore the junction gap about 0.1 μm.

Figure 11A:
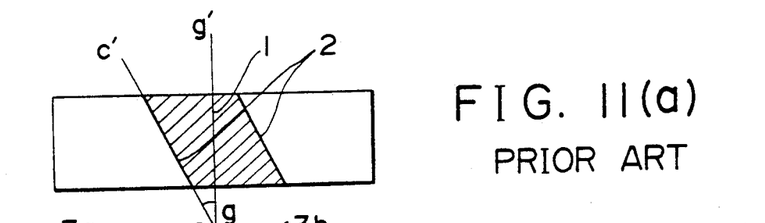
FIGS. 11(a) and 11(b) show a composite type head featuring a junction c—c' of dissimilar materials that is arranged to be not in parallel with a junction g—g' of a main gap.
Figure 11B:
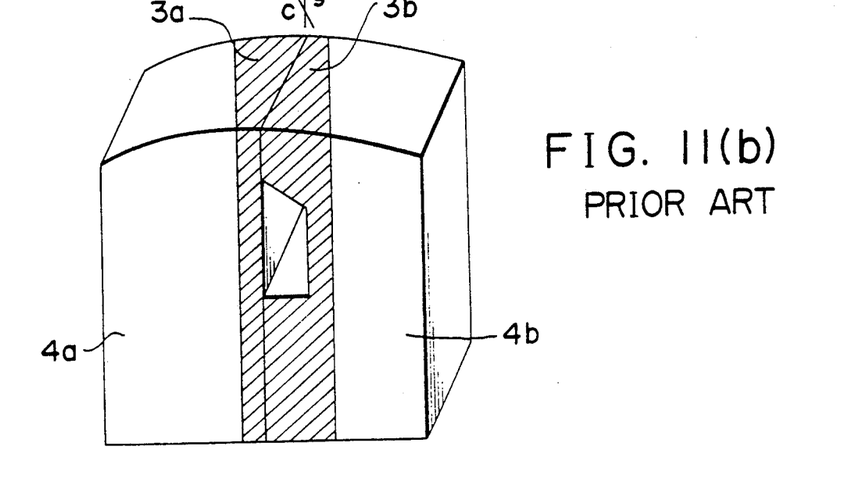

To cancel the influence exerted by this pseudo gap, for example, there is proposed a composite type magnetic head shown in FIG. 11a and 11b disclosed by the patent publication of the Japanese Patent Laid-Open No. 96013/'79. In this composite type magnetic head, there is employed a method to decrease the playback sensitivity of the pseudo gap 2 by the use of an azimuth loss by arranging the junction c—c' of the dissimilar materials to be not in parallel with the junction g—g' of the main gap.

However, since this method is to reduce the influence which a signal produced by the pseudo gap exerts upon a signal recorded/played back by the main gap 1, this method can be an effective method unless there is one type of a recording azimuth on one recording track on the magnetic recording medium.

Figure 12:
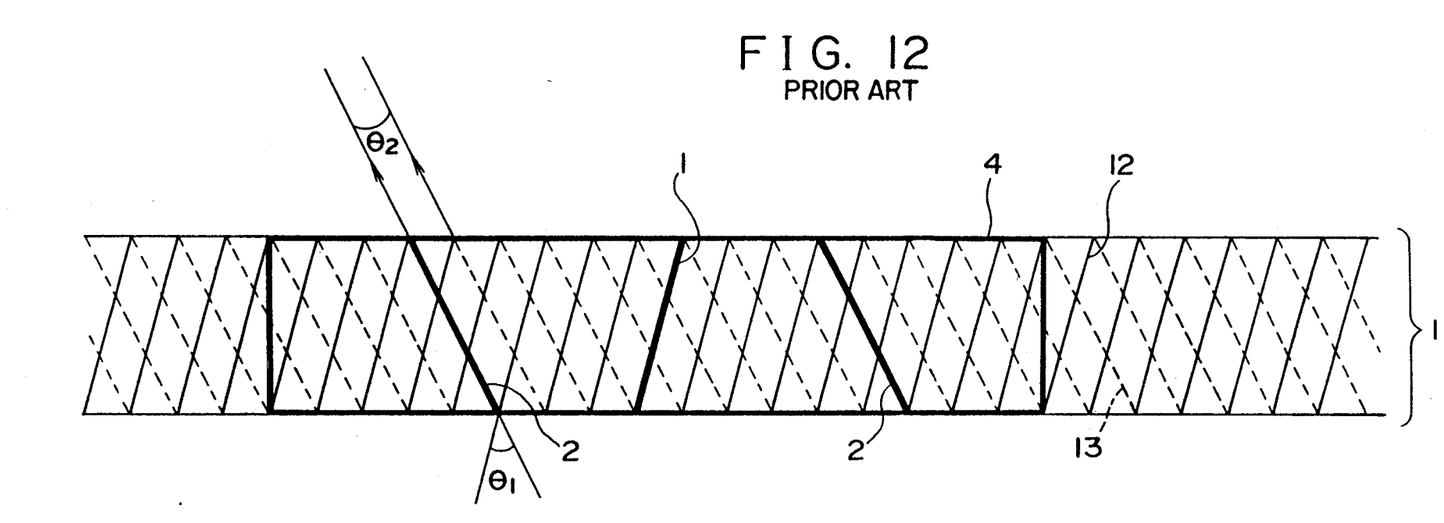
FIG. 12 is a diagram which illustrates problems caused when performing a playback or a recording-/playback using the composite type head shown in FIG. 11.

According to the magnetic recording/playback apparatus of VHS-HiFi or S-VHS-HiFi as shown in FIG. 12, both the recording azimuth 12 of the video signal and the recording azimuth 13 of an FM audio signal are recorded on one recording track 11. The FM audio signal is recorded in the depth of the same recording track 11 as the track when the video signal is recorded. Now, a consideration is given to the case that the composite type magnetic head shown in FIG. 12 is a head for video use. If the azimuth of the pseudo gap 2 preset for one head for video is similar or very close to the azimuth of the main gap (not shown) preset for the other head for audio, that is, a recording azimuth 13, the pseudo gap 2 of the head for video plays back an audio signal which deteriorates the signal-to-noise ratio of a signal played back by the main gap of the head for video.

The above-mentioned problem is also found in the head for audio use.

SUMMARY OF THE INVENTION

Accordingly, the present invention is devised to solve these problems, and the object of the present invention is to obtain a composite type magnetic head and a magnetic recording/playback apparatus using the same that reduce interference, i.e., the deterioration of the signal-to-noise ratio which a signal reproduced by the pseudo gap exerts upon a signal reproduced by the main gap.

To this end, in accordance with one aspect of the present invention, there are provided a composite type magnetic head and a magnetic recording/playback apparatus using the same comprising: a plurality of composite type magnetic heads each of which has a main gap whose azimuth is respectively set for recording and/or playing back a signal and a pair of pseudo gaps whose azimuth is arranged not to be in parallel with said main gap, wherein said pseudo gaps are also arranged to be not in parallel with the other main gap of a composite type magnetic head having a different azimuth.

With this arrangement, the output level of a signal reproduced by the pseudo gap is suppressed, thereby reducing the interference which the signal reproduced by the pseudo gaps exerts upon the signal reproduced by the main gap, that is, a deterioration of the signal-to-noise ratio.

The above and other objects, features and advantages of the present invention will become more apparent from the following detailed description of the invention when read in conjunction with the accompanying drawings.

PREFERRED EMBODIMENT OF THE INVENTION

Figure 1:
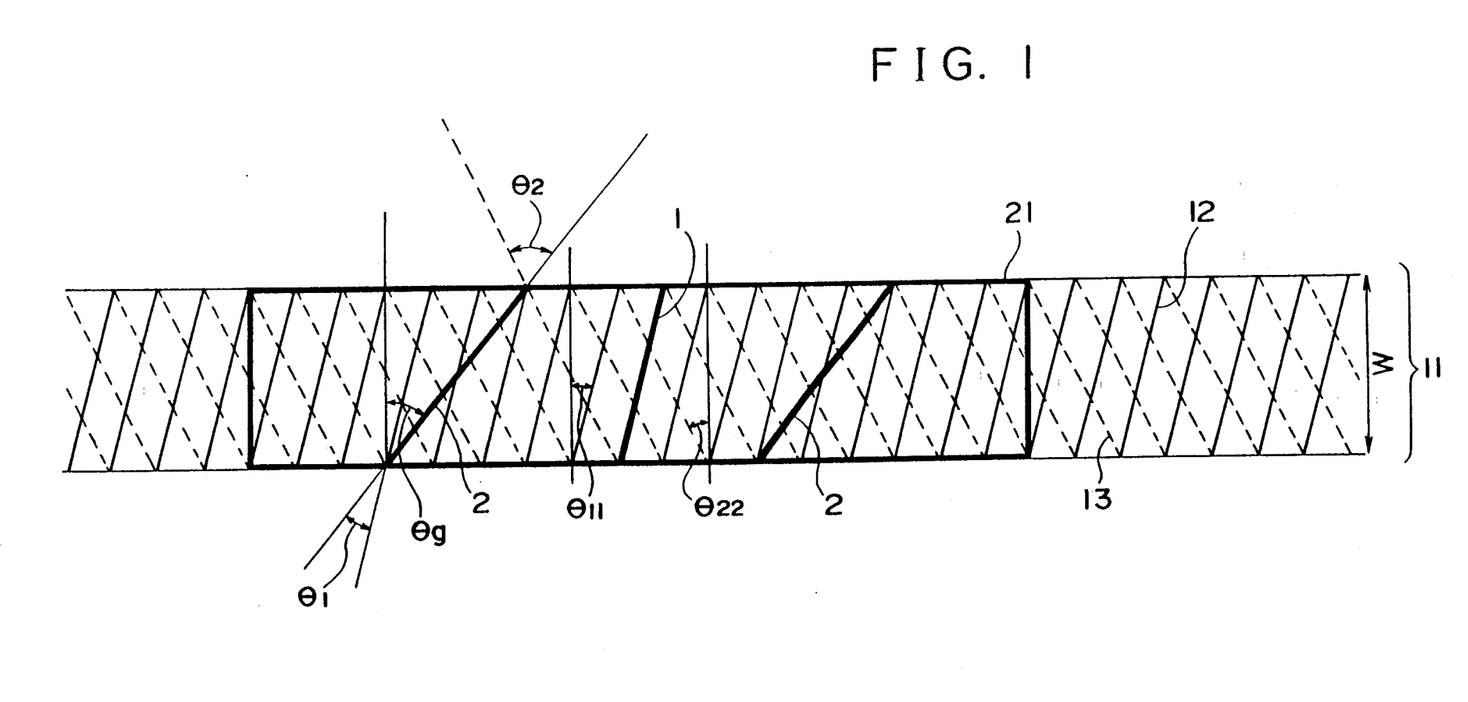
FIG. 1 shows one preferred embodiment of the present invention.

FIG. 1 shows one embodiment of the present invention.

In FIG. 1, a reference numeral 1 designates a main gap; 2, a pseudo gap; 21, a composite type magnetic head according to the present invention; 12, a recording azimuth of a signal (e.x. a video signal) recorded with the same azimuth as that of the main gap 1; 13, a recording azimuth of a signal (e.x. an FM audio signal) recorded with the azimuth different from that of the main gap 1; $\theta1$, an angle which the recording azimuth of a video signal 12 recorded with the same azimuth as that of the main gap makes with the pseudo gap 2; $\theta2$, an angle which the recording azimuth of the FM audio signal 13 recorded with the azimuth different from that of the main gap 1 makes with the pseudo gap 2; $\theta g$, an angle which the pseudo gap 2 makes with the direction of the width of the recording track 11; $\theta11$, the azimuth of the main gap 1; and $\theta22$, the recording azimuth 13 of the FM audio signal recorded with the azimuth different from that of the main gap 1, that is, the azimuth of the main gap of the head for audio. Here, the clockwise represents a positive angle.

In FIG. 1, the pseudo gap 2 keeps the angle of $\theta2$ to the recording azimuth 13 of the FM audio signal which is recorded with the azimuth different from that of the main gap 1 and also maintains the angle $\theta1$ to the recording azimuth 12 of the video signal which is recorded with the same azimuth as that of the main gap 1.

In general, an azimuth loss L is expressed by the following equation;

$$L = 20 \times \log \left( \frac{\sin\{(\pi w \tan\theta)/\lambda\}}{(\pi w \tan\theta)/\lambda} \right), \tag{1}$$

where w represents a track width; , a recording wavelength; $\theta$, an azimuth difference between the azimuth of a recording signal and the azimuth of a reproduced gap; and $$\theta1 = \theta g - \theta11$$
$$\theta2 = \theta g - \theta22 \tag{2}$$

According to the equation (1), it is possible to decide the conditions of $\theta1$ and $\theta2$ so that a necessary azimuth loss in a desired recording wavelength region can be obtained by substituting $\theta1$ and $\theta2$ for $\theta$. Further, it becomes possible to reduce a reproducing sensitivity of a signal played back by the pseudo gap 2, that is, the reproducing sensitivity of the FM audio signal 13 recorded with the azimuth different from that of the main gap 1 and a reproducing sensitivity of the video signal 12 recorded with the same azimuth as that of the main gap 1. Accordingly, the output level of the signal played back by the pseudo gap 2 is suppressed, and it becomes possible to eliminate the deterioration of the signal-to-noise ratio of the signal played back by the main gap 1 nearly completely.

Figure 2:
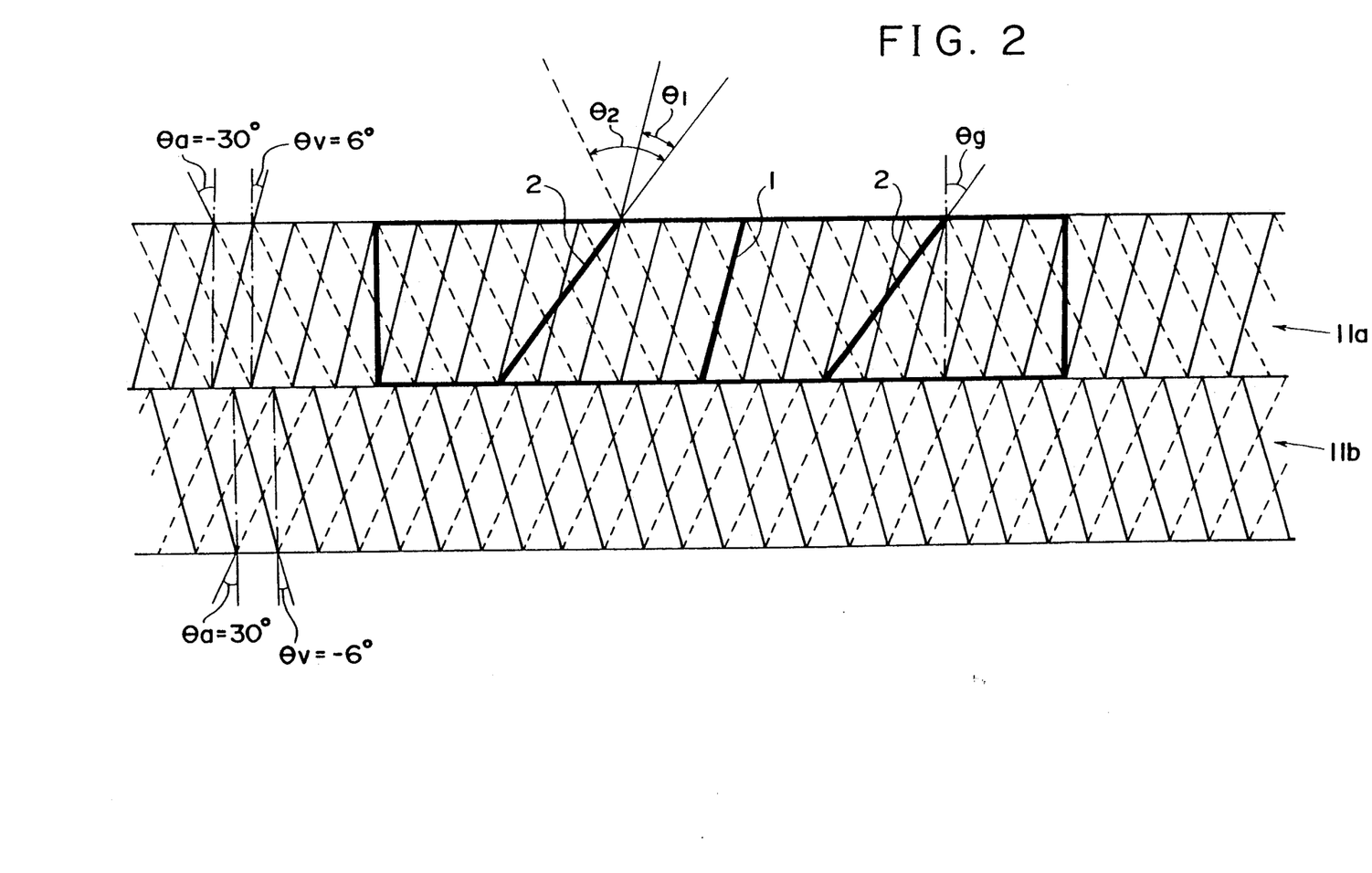
FIG. 2 shows a recording azimuth in SP mode.

As described above, a VTR of VHS-HiFi or S VHS-HiFi system adopts a method for recording an FM audio signal in the deep portion of the video signal track in order to obtain a high quality audio signal. Moreover, the recording azimuths 12 and 13 of the video signal and the FM audio signal can be switched alternately in every adjacent recording track 11. That is, as shown in FIG. 2, the video signal and the FM audio signal are recorded at the angles $\theta v = 6°$, $\theta a = -30°$ to the direction of the track width on one recording track 11a while these signals are recorded at the angles $\theta v = -6°$, $\theta a = 30°$ to the direction of the track width on the other recording track 11b. Since the embodiment method and the effect of the invention are the same in both channels, the explanation is given to only for the former recording track. Each recording azimuth 12 and 13 shown in FIG. 2 is an embodiment in SP mode (standard mode).

As shown in FIG. 2, when the azimuth $\theta g$ of the pseudo gap 2 is determined in such a manner as to obtain a sufficient azimuth loss L in accordance with the equation (1), it is possible to properly prevent the deterioration of the signal-to-noise ratio of the video signal.

Figure 3:
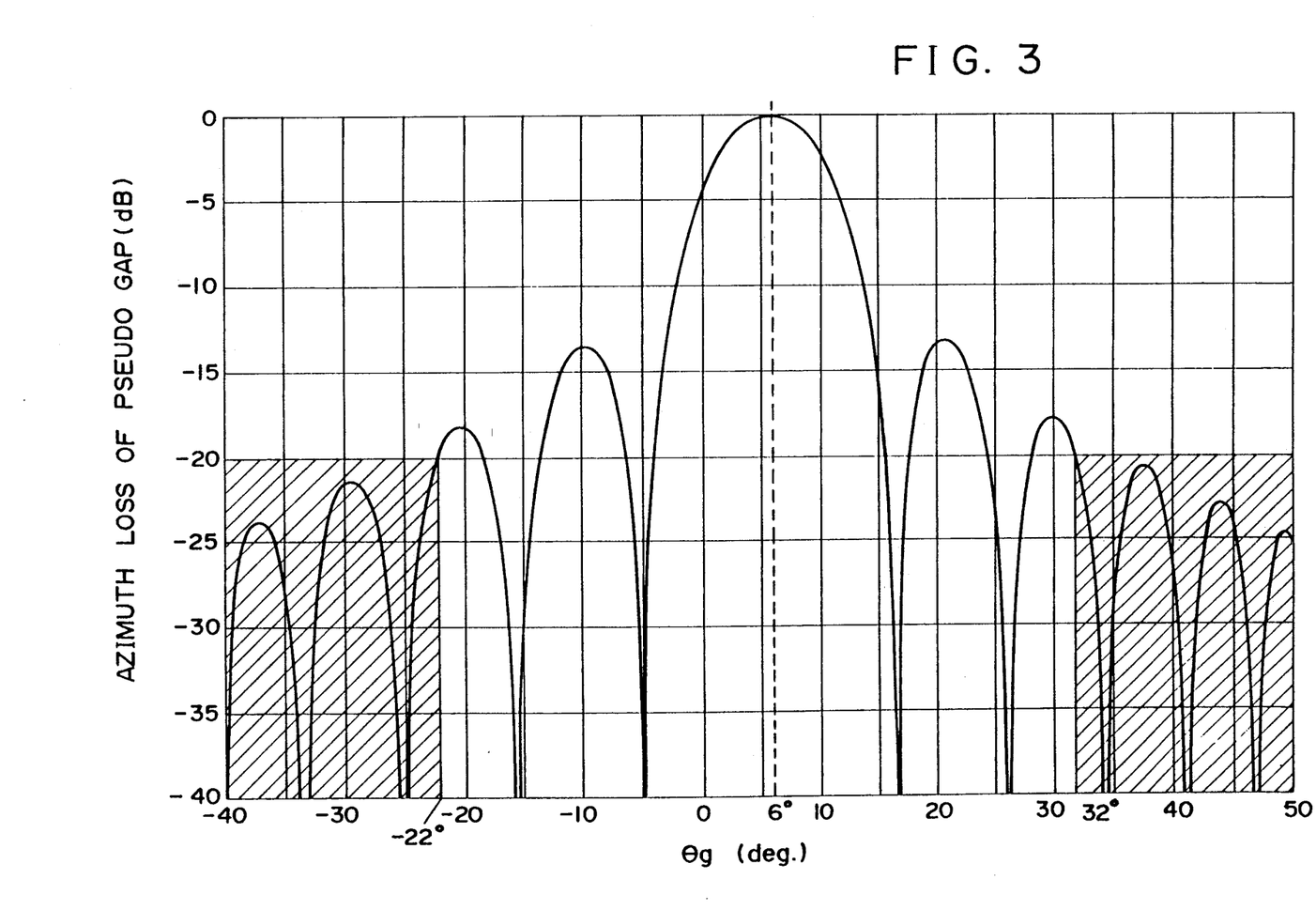
FIG. 3 is a diagram illustrating the calculation of a reproduced azimuth loss of a pseudo gap to a video signal when using the azimuth of a pseudo gap as a parameter.

For example, FIG. 3 illustrates a diagram calculating the reproduced azimuth loss L of the pseudo gap 2 to the video signal when using the azimuth $\theta g$ of the pseudo gap 2 as a parameter in SP mode of a VTR of VHS HiFi system. (The calculation is performed by substituting $\theta_1$ for the equation (1).)

Here, the azimuth loss L is calculated by substituting a recording wavelength in a carrier frequency 629 [kHz] of a color signal, that is, a longest recording wavelength of a video signal, for the equation (1) as $\theta$ in order to obtain an azimuth loss sufficient to the video signal.

Moreover, assume that it may be sufficient that the playback response of the pseudo gap 2 is one-tenth of the main gap 1, i.e., −20 [dB] and the total loss of the pseudo gap 2 is one-hundredth of the main gap 1, i.e., −40 [dB]. Therefore, it will be understood that the azimuth g satisfies the above condition in the range −22° or less and 32° or more. (condition 1)

Figure 4:
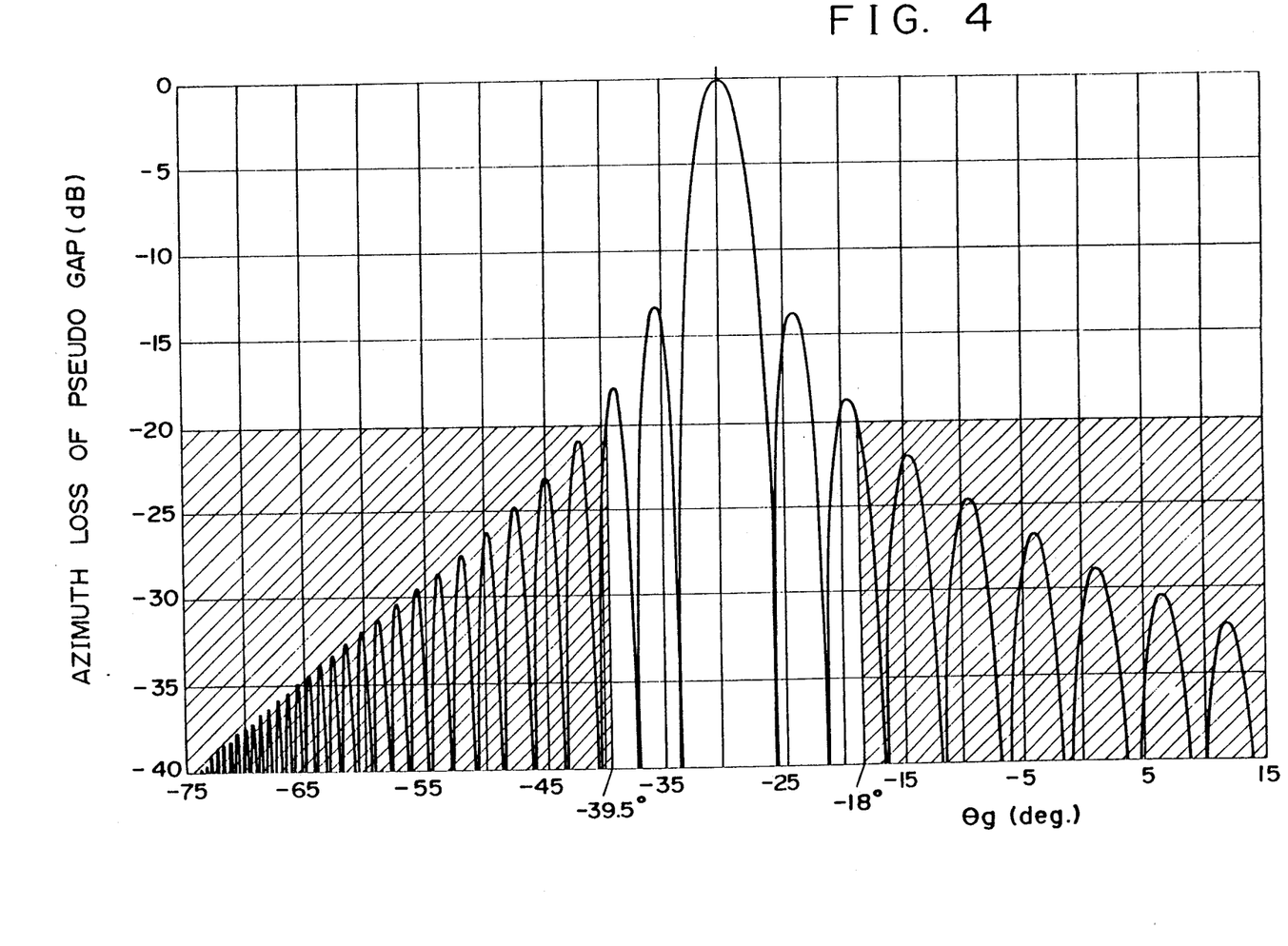
FIG. 4 is a diagram illustrating the calculation of a reproduced azimuth loss of the pseudo gap to an FM audio signal when using the azimuth of the pseudo gap as a parameter.

In addition, FIG. 4 is a diagram calculating the reproduced azimuth loss L to the FM audio signal when using the azimuth of the pseudo gap as a parameter in the same manner as in FIG. 3. (The calculation is performed by substituting $\theta_2$ for the equation (1)).

Here, the azimuth loss L is calculated by substituting a longest recording wavelength of the FM audio signal which is recorded with a longer carrier frequency 1.3 MHz of the two carrier frequencies of the FM audio signal, or 1.7 MHz and 1.3 MHz, for the equation (1) as $\lambda$.

Therefore, it will be understood that the azimuth *g satisfies the aforementioned azimuth loss condition in the range −39.5° or less and −18° or more. (condition 2)

Besides, since the angle is evidently in the range −90°<$\theta g$<90°, the $\theta g$ which satisfies both conditions 1 and 2 will be obtained in the following range:

$$-90° < \theta g \leq -39.5° \text{ or } 32° \leq \theta g < 90°.$$

Figure 5:
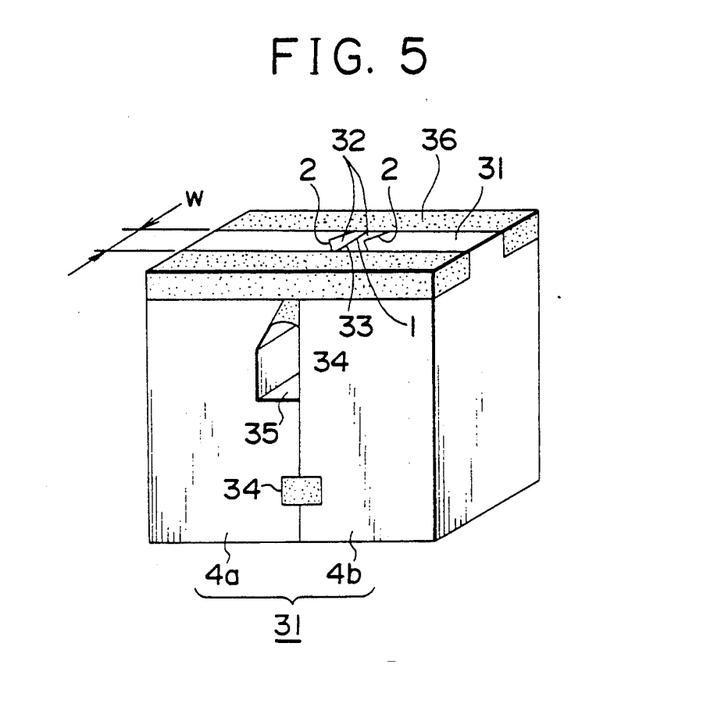
FIGS. 5 and 6 are a perspective view and a plan view of a composite type magnetic head according to one embodiment of the present invention.
Figure 6:
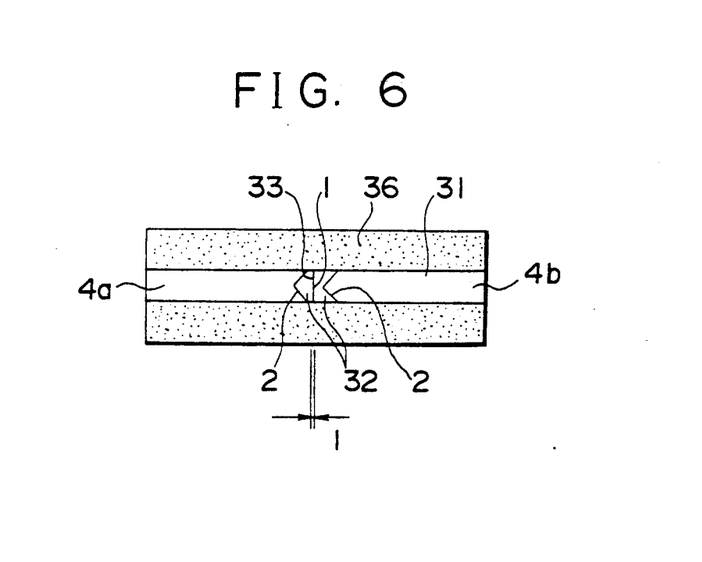

FIGS. 5 and 6 are a perspective view and a plan view of a composite type magnetic head in accordance with the present invention. In FIGS. 5 and 6, reference numerals 4a and 4b designate a half yoke core assembly composed of an oxide magnetic material such as a Mn-Zn ferrite, and a magnetic core 31 is constituted by the combination of these two half yoke core assemblies 4a and 4b. A reference numeral 32 designate a metal magnetic film, which is made of a Sendust or an Amorphous alloy, formed over the surface of the facing side of both half core assembly 4a and 4b. A reference numeral 33 designates a non-magnetic gap spacer for constituting the main gap 1 (magnetic gap) for recording or playing back a signal on a recording medium (not shown). A reference numeral 34 designates a flit glass which is inserted between the half core assemblies 4a and 4b and melted to fix the same; 35, a winding window hole for winding a coil; 36, a mold glass having a lower softening point than that of the flit glass 34, and melted and spread over the surface of the half core assemblies 4a and 4b in the manner to combine the core assemblies.

Figure 7A:
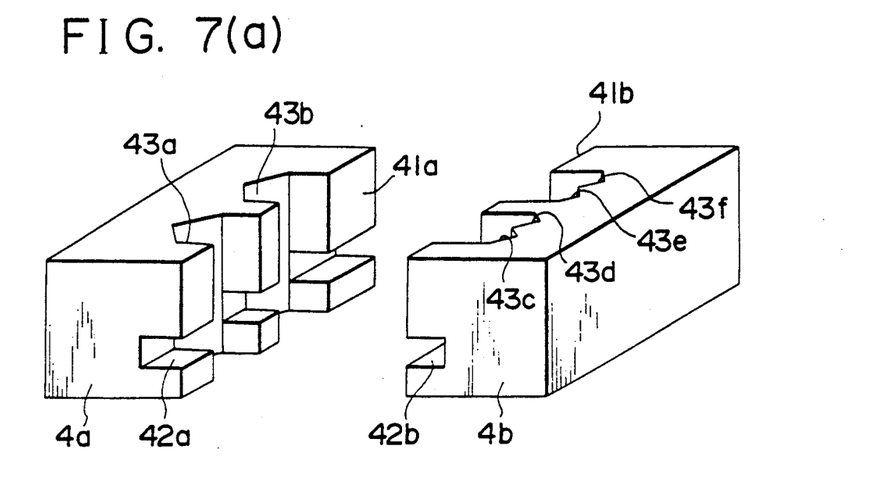
FIGS. 7(a)-7(g) are perspective views showing the composite type magnetic head shown in FIG. 5 in the manufacturing process order.

The manufacturing method of the above-mentioned composite type magnetic head will now be explained in the process step order with reference to FIG. 7. First, as shown in FIG. 7a, grooves for flit glass 42a, 42b are machined with a diamond wheel on gap surfaces 41a, 41b of the half core assemblies block 4a and 4b, and a plurality of grooves for track width preparation 43a, 43b and 43c through 43f in such a manner that the bottom of the grooves are arranged not in parallel with the gap surfaces 41a and 41b. In respect of this track width preparation groove, one track width preparation groove of the half core assembly 4a corresponds to a pair of track width preparation grooves of the other half core assembly 4b, and the width of the groove is set to be broader than the completed track width w (please refer to FIG. 1). Furthermore, the center of the groove (bottom of the V-shaped groove) provided on the half core assembly 4a and the center of the groove pair (apex of the triangle) provided on the other half core assembly 4b are aligned to come to the center of the track width.

Figure 7B:
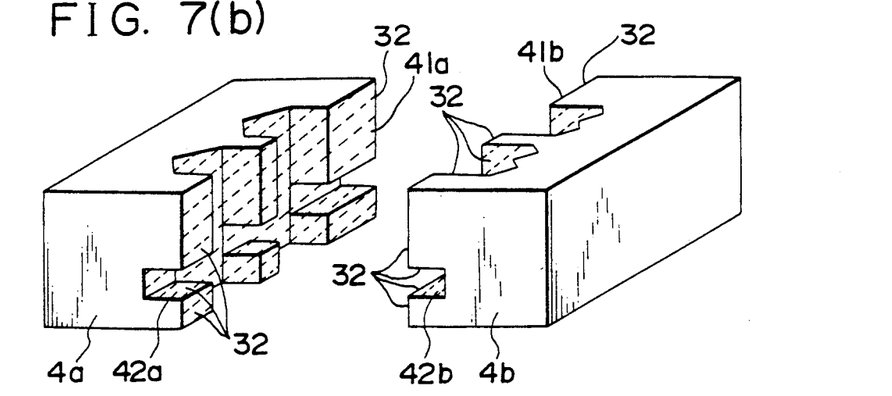

Second, as shown in FIG. 7b, a metal magnetic film 32 is formed over the track width preparation grooves 43a through 43f, the grooves for flit glass 42a, 42b and the other gap surfaces 41a, 41b of both half core assemblies 4a, 4b by means of a spattering.

Figure 7C:
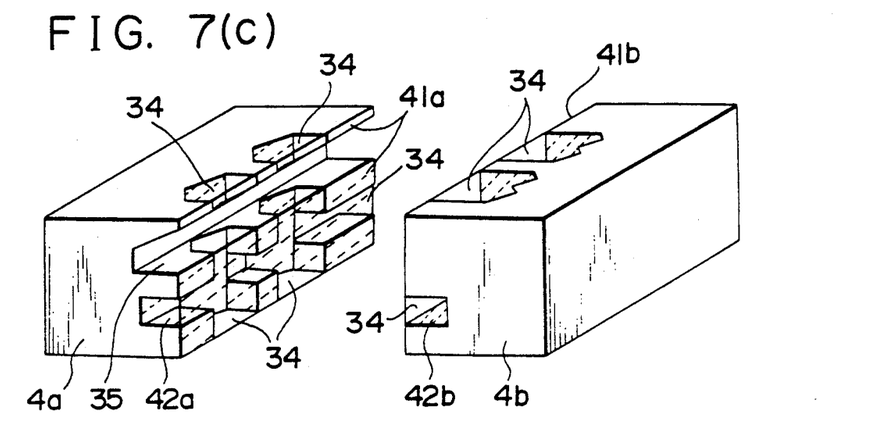

Third, as shown in FIG. 7c, the grooves for flit glass 42a, 42b and the grooves for track width preparation 43a through 43f are filled with a flit glass 34. Further, a winding window hole 35 is machined on the gap surface 41a of the half core assembly 4a.

Figure 7D:
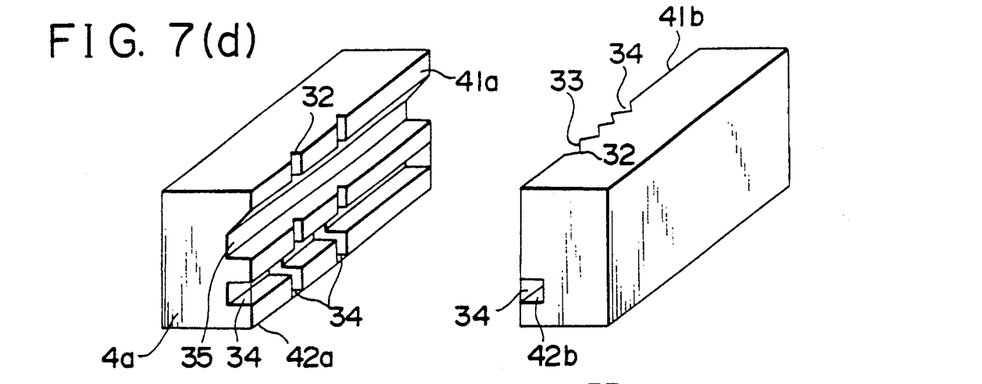

Fourth, as shown in FIG. 7d, the gap surfaces 41a, 41b are polished in such a manner that the width of the bottom which traces the track is left sufficiently broader than the completed track width w. Consequently, a film is formed over a predetermined gap spacer 33 is formed by means of a spattering. In this case, it does not make any difference whether the gap spacer 33 is formed on one side of the gap surfaces 41a, 41b or on both sides of the same.

Figure 7E:
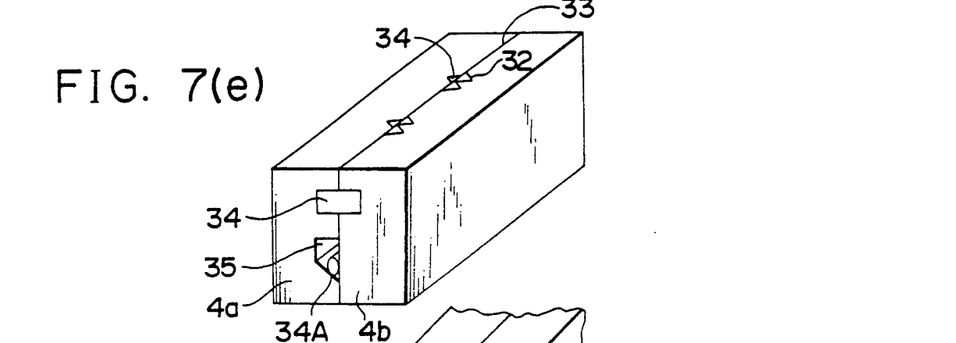

Fifth, as shown in FIG. 7e, the bottoms of both half core assemblies 4a and 4b are aligned (A rough alignment is enough) and turned it up side down with temporarily clamped. Thereafter, a glass rod 34A, the same kind of the junction glass 34, is inserted into the winding window hole 35, and all of the conjunction glasses are melted so that the half core assemblies can be firmly adhered to form an integral core block.

Figure 7F:
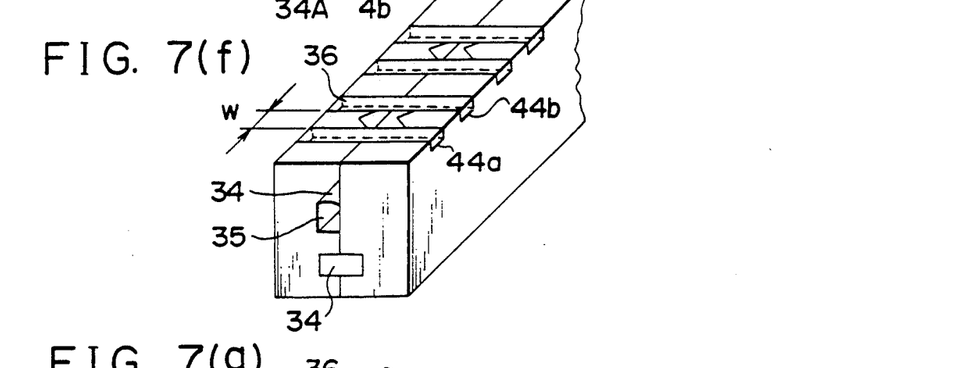

Sixth, as shown in FIG. 7f, the grooves 44a, 44b are machined with the diamond wheel in such a manner as to obtain a predetermined track width w. The bottom of these grooves 44a, 44b locates lower than the apex of the winding window hole 35 (In other words, the depth of the grooves are deeper than that of the gap.), thereby preventing the appearance of the closed magnetic circuit. A glass having the softening point lower than that of the flit glass 34 is inserted into the grooves 44a, 44b and is melted to form a mold glass (glass mold section) 36.

Figure 7G:
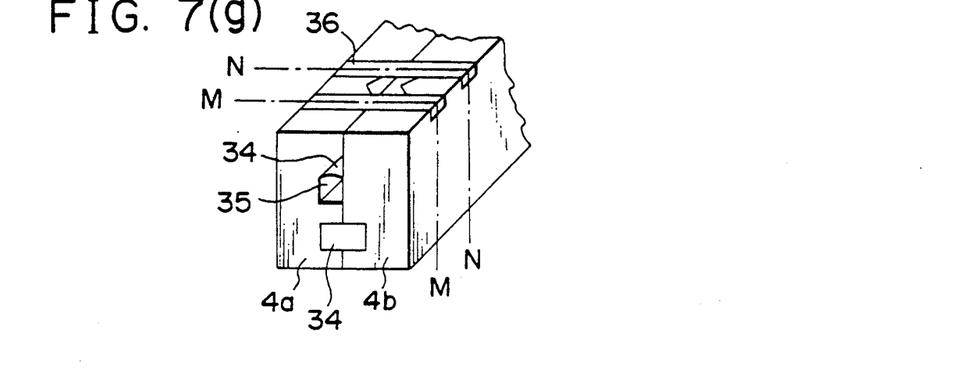

Even, as shown in FIG. 7g, the integral core block is cut into chips along the cutting lines M, N.

Thus, the composite type magnetic head shown in FIG. 5 is manufactured. If necessary, the surface which comes into contact with the magnetic tape when scanning can be machined into a circular shape. Thereafter, a given coil (not shown) is wound around the winding window hole 35.

Figure 8:
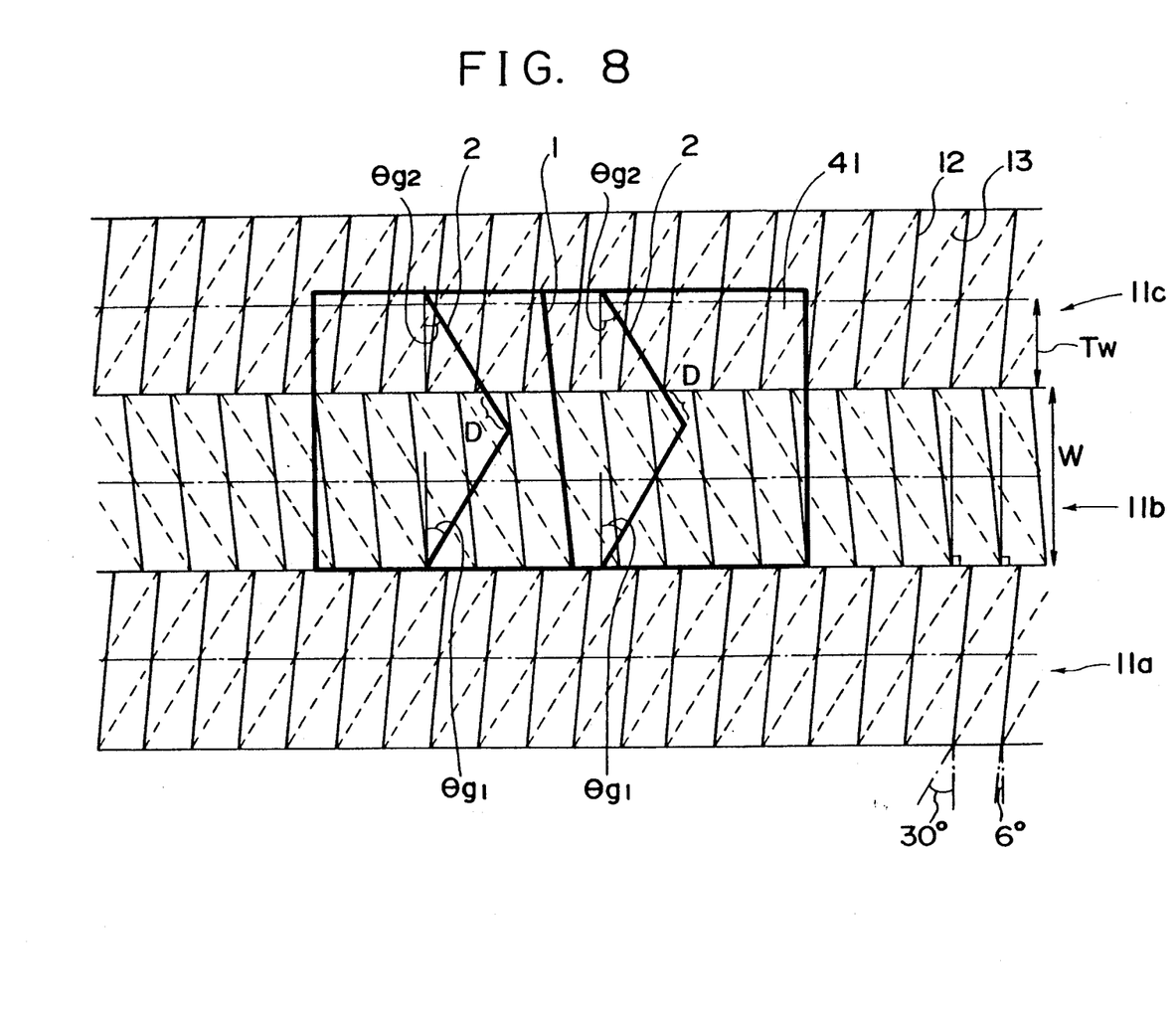
FIG. 8 is an explanatory view illustrating a state in which the magnetic head shown in FIG. 5 scans across a recording track maintaining a contact with the surface of the same in EP mode of a VHS type VTR.

FIG. 8 is an explanatory diagram illustrating the state in which the magnetic head, obtained by the embodiment of the present invention, scans across the recording track maintaining the contact with the surface of the track in EP mode (long hour mode) of the VHS-HiFi VTR. In FIG. 8, a reference numeral 1 designates a main gap; 2, a pseudo gap; 41, a surface of the magnetic head which scans maintaining the contact with the face of the track; 12, a recording azimuth of the video signal; 13, a recording azimuth of the FM audio signal; $\theta g_1$, θg2, azimuths which the pseudo gap makes with the direction of the track width.

As shown in FIG. 8, the video signal is recorded with the azimuth 6° to and the FM audio signal is recorded with the azimuth 30° to the track width direction on the tracks 11a, 11b while the video signal is recorded with the azimuth −6° and the audio signal is recorded with the azimuth of −30° to the direction of the track width on the other track 11b. In the EP mode, the video and the audio signals are recorded on the track in the order of 11a>11b>11c. The track 11b which has been recorded with the same width as that of the head is adjusted to the track width w shown in FIG. 8 by that the signal is overwritten on the overlapping portion Tw when recording.

In FIG. 8, the portion at which the azimuth of the pseudo gap 2 corresponds to the azimuth of the FM audio signal recorded in the depth is reduced as small as indicated by D, whereby the interference to the signal produced by the main gap 1 is remarkably reduced.

Meanwhile, the azimuths θg1, θg2 of the pseudo gap 2 should be decided in such a manner as to be able to obtain sufficient azimuth loss L in accordance with the equations (1) and (2).

Figure 9:
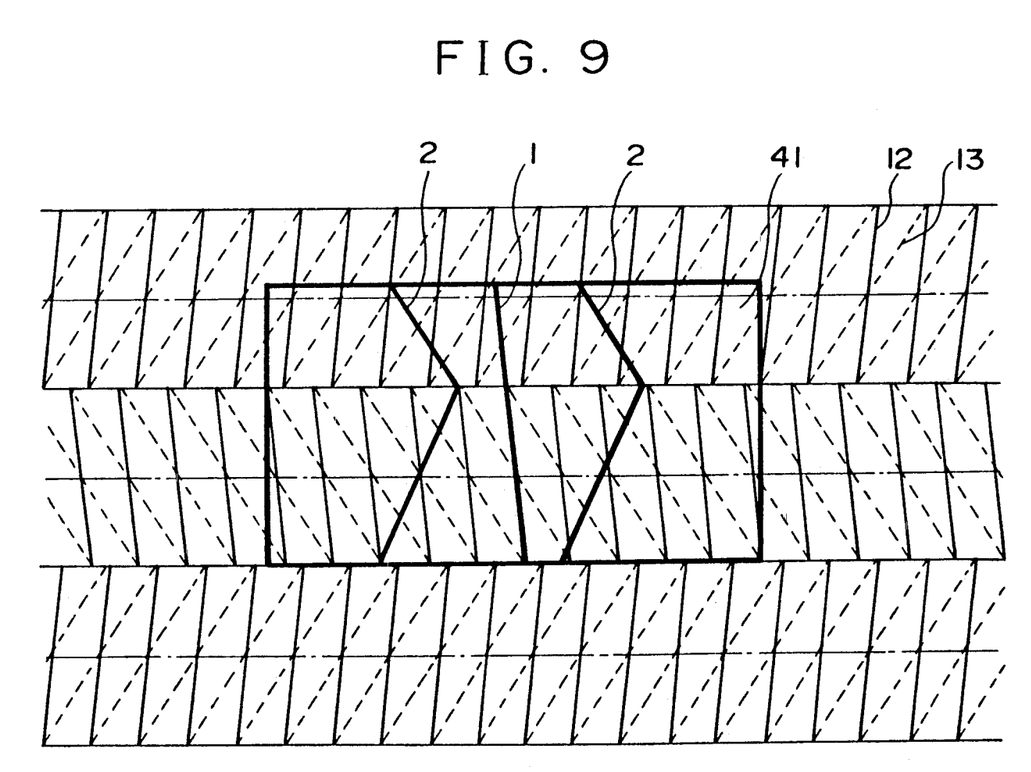
FIG. 9 is an explanatory view illustrating a state in which a magnetic head, according to another embodiment of the present invention, scans across a recording track which corresponds to the recording track shown in FIG. 8 maintaining the contract with the surface of the same.

FIG. 9 shows an embodiment which is obtained by improving the embodiment shown in FIG. 8. In FIG. 9, the apex of the pseudo gap 2 is shifted from the center of the head and aligned to the border portion of the recording track. Thereby, the overlapping portion where the azimuth of the pseudo gap 2 and the azimuth of the FM audio signal accord with each other is eliminated, resulting in a more clear signal.

As has been mentioned above, according to the composite type magnetic head of the present invention, it becomes possible to remarkably reduce the interference which the signal reproduced by the pseudo gap exerts on the signal reproduced by the main gap, thereby reproducing a signal which is superior in the signal-to-noise ratio response.

Hence, according to the magnetic recording/playback apparatus using the above described composite type magnetic head, there is the advantage of being able to reduce the signal level which the pseudo gap reproduces the signal played back, or recorded, by the main gap of the other head, thereby enhancing the signal-to-noise ratio of the signal which is played back, or recorded/played back by the main gap of the magnetic head.

What is claimed is:

1. A magnetic recording and playback apparatus, comprising:
    a plurality of magnetic heads, at least one magnetic head being a composite type magnetic head, each said at least one composite type magnetic head having a main gap and at least one pseudo gap, a pseudo gap being a boundary formed between two adjacent dissimilar non-gaseous materials;
    said main gap of said at least one composite type magnetic head having an azimuth preset for recording and/or playing back a signal;
    said at least one pseudo gap of said at least one composite type magnetic head having an azimuth which is non-parallel to said main gap of said at least one composite type magnetic head;
    said at least one pseudo gap of said at least one composite type magnetic head being non-parallel to a main gap of another of the plurality of magnetic heads, the another magnetic head having a main gap with a preset azimuth different from said preset azimuth of said main gap of said at least one composite type magnetic head.

2. The magnetic recording and playback apparatus as claimed in claim 1, wherein said azimuth of said main gap of said at least one composite type magnetic head is preset for video use and said azimuth of said main gap of said another of the plurality of magnetic heads is preset for audio use.

3. The magnetic recording and playback apparatus of claim 1, wherein said azimuth of said at least one pseudo gap $\theta g$ of said one composite type magnetic head is set such that an azimuth loss L of said at least one pseudo gap is $$L = 20 \times \log\left(\frac{\sin((\pi w \tan\theta)/\lambda)}{(\pi w \tan\theta)/\lambda}\right),$$

and $\theta_1 = \theta g - \theta_{11}$ and $\theta_2 = \theta g - \theta_{22}$, where w is a recording track width, $\lambda$ is a recording wavelength, $\theta_1$ and $\theta_2$ are azimuth differences between the azimuth of said at least one pseudo gap and an azimuth of a recording signal, $\theta_{11}$ is an azimuth of a recorded signal which is equal to the azimuth of said main gap of said one composite type magnetic head, $\theta_{22}$ is an azimuth of a recorded signal different from the azimuth of said main gap of said one composite type magnetic head, and $\theta g$ is said azimuth of said at least one pseudo gap determined from $\theta_1$ and $\theta_2$ when a desired azimuth loss L is obtained.

4. The magnetic recording and playback apparatus as claimed in claim 3, wherein said azimuth $\theta g$ of said at least one pseudo gap satisfies:

$$-90° < \theta g \leq -39.5° \text{ or } 32° \leq \theta g < 90°.$$

5. A composite type magnetic head composed of a plurality of dissimilar solid materials, comprising:
    a main gap having an azimuth preset for recording or playing back a signal; and
    at least one pseudo gap, a pseudo gap being a boundary formed between two adjacent dissimilar solid materials, each pseudo gap having an azimuth preset to be non-parallel to said main gap;
    said azimuth of said at least one pseudo gaps being arranged non-parallel to an azimuth of a signal recorded on a recording track.

6. The composite type magnetic head as claimed in claim 5, wherein said azimuth of said at least one pseudo gap $\theta g$ is set such that an azimuth loss L of said at least one pseudo gap is $$L = 20 \times \log\left(\frac{\sin((\pi w \tan\theta)/\lambda)}{(\pi w \tan\theta)/\lambda}\right),$$

and $\theta_1 = \theta g - \theta_{11}$ and $\theta_2 = \theta g - \theta_{22}$, where w is a recording track width, $\lambda$ is a recording wavelength, $\theta_1$ and $\theta_2$ are azimuth differences between the azimuth of said at least one pseudo gap and an azimuth of a recording signal, $\theta_{11}$ is a azimuth of a recorded signal which is equal to the azimuth of said main gap, $\theta_{22}$ is a azimuth of a recorded signal different from the azimuth of said main gap, and $\theta g$ is said azimuth of said at least one pseudo gap determined from $\theta_1$ and $\theta_2$ when a desired azimuth loss L is obtained.

7. The composite type magnetic head as claimed in claim 5, wherein said at least one pseudo gap is formed as a V-shape or an inverted V-shape with respect to a recording azimuth.

8. A composite type magnetic head according to claim 5, said pseudo gap is formed in the V-shaped or the inverted V-shaped to a recording azimuth.

9. The composite type magnetic head as claimed in claim 8, wherein an apex of the V-shaped or inverted V-shaped at least one pseudo gap coincides with a center of said magnetic head.

10. The composite type magnetic head as claimed in claim 8, wherein an apex of the V-shaped or inverted V-shaped at least one pseudo gap coincides with a width of a recording track.

* * * * *